US012421383B2

(12) United States Patent
Eim

(10) Patent No.: US 12,421,383 B2
(45) Date of Patent: Sep. 23, 2025

(54) THERMOPLASTIC RESIN COMPOSITION AND MOLDED PRODUCT MANUFACTURED THEREFROM

(71) Applicant: LOTTE CHEMICAL CORPORATION, Seoul (KR)

(72) Inventor: Sung Oh Eim, Uiwang-si (KR)

(73) Assignee: Lotte Chemical Corporation, Seoul (KR)

(*) Notice: Subject to any disclaimer, the term of this patent is extended or adjusted under 35 U.S.C. 154(b) by 1008 days.

(21) Appl. No.: 17/439,843

(22) PCT Filed: Apr. 17, 2020

(86) PCT No.: PCT/KR2020/005138
§ 371 (c)(1),
(2) Date: Sep. 16, 2021

(87) PCT Pub. No.: WO2020/222449
PCT Pub. Date: Nov. 5, 2020

(65) Prior Publication Data
US 2022/0186019 A1 Jun. 16, 2022

(30) Foreign Application Priority Data
Apr. 30, 2019 (KR) .................. 10-2019-0050235

(51) Int. Cl.
C08L 51/04 (2006.01)
C08K 3/08 (2006.01)
C08K 3/22 (2006.01)
C08L 33/08 (2006.01)

(52) U.S. Cl.
CPC .............. *C08L 51/04* (2013.01); *C08L 33/08* (2013.01); *C08K 2003/0806* (2013.01); *C08K 2003/2296* (2013.01); *C08K 2201/005* (2013.01)

(58) Field of Classification Search
CPC .......... C08L 51/04; C08L 33/08; C08L 33/10; C08L 33/12; C08K 2003/0806; C08K 2003/2296
See application file for complete search history.

(56) References Cited

U.S. PATENT DOCUMENTS

| 2009/0148191 A1 | 6/2009 | Kubo |
| 2017/0088704 A1 | 3/2017 | Park |
| 2018/0002521 A1* | 1/2018 | Jang ..................... C08L 33/08 |
| 2018/0179314 A1 | 6/2018 | Kim et al. |

FOREIGN PATENT DOCUMENTS

| CN | 106084609 A | * 11/2016 | ............. C08K 13/02 |
| CN | 106947200 A | 7/2017 | |
| CN | 107603101 A | 1/2018 | |
| JP | 11035787 A | * 2/1999 | |
| JP | 11-277991 A | 10/1999 | |
| JP | 2005-179607 A | 7/2005 | |
| JP | 2005-290179 A | 10/2005 | |
| JP | 2009-139663 A | 6/2009 | |
| JP | 2018-104686 A | 7/2018 | |
| KR | 10-0696385 B1 | 3/2007 | |
| KR | 10-2009-0088538 A | 8/2009 | |
| KR | 10-2011-0018584 A | 2/2011 | |
| KR | 101334283 B1 | * 11/2013 | ............... C08K 3/22 |
| KR | 101486564 B1 | * 1/2015 | ............. C08L 51/04 |
| KR | 10-2017-0039048 A | 4/2017 | |
| WO | 2020/222449 A1 | 11/2020 | |

OTHER PUBLICATIONS

Machine translation of JP 11035787 (1999, 13 pages).*
Machine translation of CN 106084609 (2016, 9 pages).*
Machine translation of KR 101334283 (2013, 14 pages).*
Machine translation of KR 101486564 (2015, 11 pages).*
Office Action in counterpart Chinese Patent Application No. 202080031080.0 dated Mar. 24, 2023, pp. 1-8.
International Search Report in counterpart International Application No. PCT/KR2020/005138 dated Jul. 21, 2020, pp. 1-4.
Office Action in counterpart Japanese Patent Application No. 2021-563369 dated Jan. 9, 2024, pp. 1-3.
Extended European Search Report in counterpart European Application No. 20798087.1 dated Dec. 22, 2022, pp. 1-4.

* cited by examiner

*Primary Examiner* — Brieann R Johnston
(74) *Attorney, Agent, or Firm* — Additon, Pendleton & Witherspoon, P.A.

(57) ABSTRACT

A thermoplastic resin composition of the present invention comprises approximately 100 parts by weight of a rubber-modified aromatic vinyl-based copolymer resin, approximately 50-150 parts by weight of a polyalkyl (meth)acrylate resin, approximately 0.1-3 parts by weight of a silver (Ag)-based compound; and approximately 0.5-10 parts by weight of zinc oxide, wherein the zinc oxide is composed of primary particles and secondary particles, the average particle size (D50) of the primary particles, measured by means of a particle size analyzer, is approximately 1-50 nm, and the average particle size (D50) of the secondary particles is approximately 0.1-10 μm. The thermoplastic resin composition has excellent antibacterial property, thermal stability, transparency, metal texture and the like.

11 Claims, No Drawings

THERMOPLASTIC RESIN COMPOSITION AND MOLDED PRODUCT MANUFACTURED THEREFROM

CROSS-REFERENCE TO RELATED APPLICATIONS

This application claims priority to and the benefit of International Application No. PCT/KR2020/005138, filed Apr. 17, 2020, which published as WO 2020/222449 on Nov. 5, 2020, and Korean Patent Application No. 10-2019-0050235, filed in the Korean Intellectual Property Office on Apr. 30, 2019, the entire disclosure of each of which is incorporated herein by reference.

TECHNICAL FIELD

The present invention relates to a thermoplastic resin composition and a molded product produced therefrom. More particularly, the present invention relates to a thermoplastic resin composition, which has good properties in terms of antibacterial effects, thermal stability, transparency, metal texture, and the like, and a molded product produced therefrom.

BACKGROUND ART

Recently, with increasing interest in personal health and hygiene and increasing income level, there is increasing demand for thermoplastic resin products having antibacterial and hygienic functions. Accordingly, there is increasing demand for thermoplastic resin products subjected to antibacterial treatment to remove or inhibit bacterial growth on surfaces of household goods and electronic products. Therefore, development of a functional antibacterial material having stability and reliability (an antibacterial thermoplastic resin composition) is a very important challenge.

Such an antibacterial thermoplastic resin composition requires an antibacterial agent. The antibacterial agent can be classified into an organic antibacterial agent and an inorganic antibacterial agent.

Despite advantages of relative inexpensiveness and good antibacterial effects with a small amount of the organic antibacterial agent, the organic antibacterial agent is sometimes toxic to the human body and is only effective against certain bacteria, and there is a concern that the antibacterial effects of the organic antibacterial agent can be lost through decomposition upon processing at high temperature. Moreover, the organic antibacterial agent can cause discoloration after processing and has short antibacterial persistence due to elution thereof. Thus, the range of antibacterial agents applicable to the antibacterial thermoplastic resin composition is very limited.

The inorganic antibacterial agent contains metal components, such as silver (Ag) and copper (Cu), and exhibits good thermal stability to be frequently used in preparation of the antibacterial thermoplastic resin composition (antibacterial resin). However, the inorganic antibacterial agent must be added in an excess amount due to insufficient antibacterial properties thereof, as compared with the organic antibacterial agents, and the use of the inorganic antibacterial agent is very restricted due to disadvantages, such as relatively high price, a problem of uniform distribution upon processing, discoloration due to the metallic components, and the like.

Moreover, when a thermoplastic resin composition is used as a luminous material, metal texture is an important issue. However, when a typical antibacterial agent is applied to the luminous material, there is a concern of deterioration in metal texture, transparency, and the like.

Therefore, there is a need for development of a thermoplastic resin composition having good properties in terms of antibacterial properties, thermal stability, transparency, metal texture, and the like.

The background technique of the present invention is disclosed in Korean Patent Registration No. 10-0696385 and the like.

DISCLOSURE

Technical Problem

It is one aspect of the present invention to provide a thermoplastic resin composition which has good properties in terms of antibacterial properties, thermal stability, transparency, metal texture, and the like.

It is another aspect of the present invention to provide a molded product formed of the thermoplastic resin composition set forth above.

The above and other aspects of the present invention will become apparent from the detailed description of the following embodiments.

Technical Solution

1. One aspect of the present invention relates to a thermoplastic resin composition. The thermoplastic resin composition includes: about 100 parts by weight of a rubber-modified aromatic vinyl copolymer resin; about 50 to about 150 parts by weight of a poly(alkyl (meth)acrylate) resin; about 0.1 to about 3 parts by weight of a silver (Ag) compound; and about 0.5 to about 10 parts by weight of zinc oxide, wherein the zinc oxide includes primary particles and secondary particles, the primary particles having an average particle diameter (D50) of about 1 nm to about 50 nm, the secondary particles having an average particle diameter (D50) of about 0.1 μm to about 10 μm.

2. In Embodiment 1, the silver compound and the zinc oxide may be present in a weight ratio (silver compound: zinc oxide) of about 1:3 to about 1:7.

3. In Embodiment 1 or 2, the rubber-modified aromatic vinyl copolymer resin may include a rubber-modified vinyl graft copolymer and an aromatic vinyl copolymer resin.

4. In Embodiments 1 to 3, the rubber-modified vinyl graft copolymer may be obtained through graft polymerization of an alkyl (meth)acrylate, an aromatic vinyl monomer, and a vinyl cyanide monomer to a rubber polymer.

5. In Embodiments 1 to 4, the aromatic vinyl copolymer resin may be obtained through polymerization of an aromatic vinyl monomer and a monomer copolymerizable with the aromatic vinyl monomer.

6. In Embodiments 1 to 5, the poly(alkyl (meth)acrylate) resin may have a weight average molecular weight of about 50,000 g/mol to about 150,000 g/mol.

7. In Embodiments 1 to 6, the silver compound may include at least one of metallic silver, silver oxide, halogenated silver, and a silver ion-containing support.

8. In Embodiments 1 to 7, the thermoplastic resin composition may have an antibacterial activity of about 2 to about 7 against each of *Staphylococcus aureus* and *Escherichia coli*, as calculated according to Equation 1 after inoculation of 5 cm×5 cm specimens with *Staphylococcus aureus* and *Escherichia coli*, respectively, and culturing under conditions of 35° C. and 90% RH (relative humidity) for 24 hours in accordance with JIS Z 2801:

$$\text{Antibacterial activity} = \log(M1/M2) \quad \text{[Equation 1]}$$

where M1 denotes the number of bacteria as measured on a blank specimen after culturing for 24 hours and M2 denotes the number of bacteria as measured on each of the specimens of the thermoplastic resin composition after culturing for 24 hours.

9. In Embodiments 1 to 8, the thermoplastic resin composition may have a haze of about 1% to about 5% and a light transmittance of about 88% to about 93%, as measured on a 2.5 mm thick specimen in accordance with ASTM D1003.

10. In Embodiments 1 to 9, the thermoplastic resin composition may have a flop index of about 8 to about 11, as calculated by Equation 2:

$$\text{Flop Index} = \frac{2.69(L^*_{15°} \cdot L^*_{110°})^{1.11}}{(L^*_{45°})^{0.86}} \quad \text{[Equation 2]}$$

where $L^*_{15°}$, $L^*_{45°}$ and $L^*_{110°}$ mean luminance $L^*$ of reflected light, as measured at angles of 15°, 45° and 110° using a spectrophotometer, respectively.

11. Another aspect of the present invention relates to a molded product. The molded product is formed of the thermoplastic resin composition according to any one of Embodiments 1 to 10.

Advantageous Effects

The present invention provides a thermoplastic resin composition which has good properties in terms of antibacterial properties, thermal stability, transparency, metal texture, and the like.

BEST MODE

Hereinafter, exemplary embodiments of the present invention will be described in detail.

A thermoplastic resin composition according to the present invention includes: (A) a rubber-modified aromatic vinyl copolymer resin; (B) a poly(alkyl (meth)acrylate) resin; (C) a silver (Ag) compound; and (C) zinc oxide.

As used herein to represent a specific numerical range, "a to b" is defined as "≥a and ≤b".

(A) Rubber-Modified Aromatic Vinyl Copolymer Resin

The rubber-modified aromatic vinyl copolymer resin according to the present invention may be selected from any rubber-modified aromatic vinyl copolymer resins used in a typical transparent thermoplastic resin composition and may include, for example, (A1) a rubber-modified vinyl graft copolymer and (A2) an aromatic vinyl copolymer resin.

(A1) Rubber-Modified Vinyl Graft Copolymer

The rubber-modified vinyl graft copolymer according to the present invention serves to improve transparency, impact resistance, and fluidity of the thermoplastic resin composition, and may be obtained through graft polymerization of an alkyl (meth)acrylate, an aromatic vinyl monomer and a vinyl cyanide monomer to a rubber polymer. For example, the rubber-modified vinyl graft copolymer may be obtained through graft polymerization of a monomer mixture including the alkyl (meth)acrylate, the aromatic vinyl monomer and the vinyl cyanide monomer to the rubber polymer, in which the monomer mixture may further include a monomer for imparting processability and heat resistance, as needed. Here, polymerization may be performed by any suitable polymerization method known in the art, such as emulsion polymerization, suspension polymerization, and mass polymerization.

In some embodiments, the rubber polymer may include diene rubbers, such as polybutadiene, poly(styrene-butadiene), and poly(acrylonitrile-butadiene), saturated rubbers obtained by adding hydrogen to the diene rubbers, isoprene rubbers, acrylic rubbers, such as poly(butyl acrylate), and ethylene-propylene-diene terpolymer (EPDM). These may be used alone or as a mixture thereof. For example, the rubber polymer may include diene rubbers, specifically a butadiene rubber.

In some embodiments, the rubber polymer (rubber particles) may have an average (z-average) particle diameter of about 0.1 μm to about 0.5 μm, for example, about 0.2 μm to about 0.4 μm. Within this range, the thermoplastic resin composition can have good properties in terms of impact resistance, heat resistance, fluidity, and the like without deterioration in transparency. Here, the average (z-average) particle diameter of the rubber polymer (rubber particles) may be measured by a light scattering method in a latex state. Specifically, a rubber polymer latex is filtered through a mesh to remove coagulum generated during polymerization of the rubber polymer. Then, a mixed solution of 0.5 g of the latex and 30 ml of distilled water is placed in a 1,000 ml flask, which in turn is filled with distilled water to prepare a specimen. Then, 10 ml of the specimen is transferred to a quartz cell, followed by measurement of the average particle diameter of the rubber polymer using a light scattering particle analyzer (Malvern Co., Ltd., Nano-zs).

In some embodiments, the rubber polymer may be present in an amount of about 5 wt % to about 65 wt %, for example, about 10 wt % to about 60 wt %, based on the total weight (100 wt %) of the rubber-modified vinyl graft copolymer, and the monomer mixture (including the alkyl (meth)acrylate, the aromatic vinyl monomer and the vinyl cyanide monomer) may be present in an amount of about 35 wt % to about 95 wt %, for example, about 40 wt % to about 90 wt %, based on 100 wt % of the rubber-modified vinyl graft copolymer. Within this range, the thermoplastic resin composition can have good properties in terms of impact resistance, transparency, heat resistance, fluidity, and the like.

In some embodiments, the alkyl (meth)acrylate may be graft copolymerizable with the rubber polymer or the aromatic vinyl monomer and may include, for example, a $C_1$ to $C_{10}$ alkyl (meth)acrylate, for example, methyl (meth)acrylate, ethyl (meth)acrylate, propyl (meth)acrylate, butyl (meth)acrylate, and the like, specifically methyl (meth) acrylate. The alkyl (meth)acrylate may be present in an amount of about 55 wt % to about 85 wt %, for example, about 60 wt % to about 80 wt %, based on 100 wt % of the monomer mixture. Within this range, the thermoplastic resin composition can have good properties in terms of impact resistance, transparency, heat resistance, fluidity, and the like.

In some embodiments, the aromatic vinyl monomer may be graft copolymerizable with the rubber polymer and may include, for example, styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like. These may be used alone or as a mixture thereof. The aromatic vinyl monomer may be present in an amount of about 10 wt % to about 40 wt %, for example, about 15 wt % to about 35 wt %, based on 100 wt % of the monomer mixture. Within this range, the thermoplastic resin composition can have good properties in terms of impact resistance, transparency, heat resistance, fluidity, and the like.

In some embodiments, the vinyl cyanide monomer is a monomer copolymerizable with the aromatic vinyl monomer and may include, for example, acrylonitrile, methacrylonitrile, ethacrylonitrile, phenyl acrylonitrile, α-chloroacrylonitrile, and fumaronitrile, without being limited thereto. These may be used alone or as a mixture thereof. For example, the vinyl cyanide monomer may be acrylonitrile, methacrylonitrile, and the like. The vinyl cyanide monomer may be present in an amount of about 1 wt % to about 30 wt %, for example, about 5 wt % to about 25 wt %, based on 100 wt % of the monomer mixture. Within this range, the thermoplastic resin composition can have good properties in terms of impact resistance, transparency, heat resistance, fluidity, and the like.

In some embodiments, the monomer for imparting processability and heat resistance may include, for example, (meth)acrylic acid, maleic anhydride, and N-substituted maleimide, without being limited thereto. The monomer for imparting processability and heat resistance may be present in an amount of about 15 wt % or less, for example, about 0.1 wt % to about 10 wt %, based on 100 wt % of the monomer mixture. Within this range, the monomer for imparting processability and heat resistance can impart processability and heat resistance to the thermoplastic resin composition without deterioration in other properties.

In some embodiments, the rubber-modified vinyl graft copolymer may be a methyl methacrylate-acrylonitrile-butadiene-styrene graft copolymer (g-MABS). Here, the g-MABS may include polybutadiene (PBD), which constitutes the rubber polymer (core), and a methyl methacrylate-acrylonitrile-styrene copolymer shell grafted to the core, in which the shell may include an inner shell comprising an acrylonitrile-styrene resin and an outer shell comprising poly(methyl methacrylate), without being limited thereto.

In some embodiments, the rubber-modified vinyl graft copolymer may be present in an amount of about 5 wt % to about 60 wt %, for example, about 10 wt % to about 50 wt %, based on 100 wt % of the rubber-modified aromatic vinyl copolymer resin. Within this range, the thermoplastic resin composition can exhibit good properties in terms of transparency, impact resistance, heat resistance, fluidity, and balance therebetween.

(A2) Aromatic Vinyl Copolymer Resin

The aromatic vinyl copolymer resin according to one embodiment may be an aromatic vinyl copolymer resin used in a typical rubber-modified aromatic vinyl copolymer resin. For example, the aromatic vinyl copolymer resin may be obtained through polymerization of a monomer mixture including an aromatic vinyl monomer and a monomer copolymerizable with the aromatic vinyl monomer, such as a vinyl cyanide monomer and the like.

In some embodiments, the aromatic vinyl copolymer resin may be obtained by mixing the aromatic vinyl monomer and the monomer copolymerizable with the aromatic vinyl monomer, followed by polymerization of the mixture, which may be performed by any suitable polymerization method known in the art, such as emulsion polymerization, suspension polymerization, and mass polymerization.

In some embodiments, the aromatic vinyl monomer may include, for example, styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like. These may be used alone or as a mixture thereof. The aromatic vinyl monomer may be present in an amount of about 20 wt % to about 90 wt %, for example, about 30 wt % to about 85 wt %, based on 100 wt % of the aromatic vinyl copolymer resin. Within this range, the thermoplastic resin composition can have good properties in terms of impact resistance, fluidity, and the like.

In some embodiments, the monomer copolymerizable with the aromatic vinyl monomer may include at least one of, for example, vinyl cyanide monomers, such as acrylonitrile, methacrylonitrile, ethacrylonitrile, phenyl acrylonitrile, α-chloroacrylonitrile, and fumaronitrile, (meth)acrylic acid alkyl esters thereof, maleic anhydride, N-substituted maleimide, and combinations thereof. The monomer copolymerizable with the aromatic vinyl monomer may be present in an amount of about 10 wt % to about 80 wt %, for example, about 15 wt % to about 70 wt %, based on 100 wt % of the aromatic vinyl copolymer resin. Within this range, the thermoplastic resin composition can exhibit good properties in terms of impact resistance, fluidity, and the like.

In some embodiments, the aromatic vinyl copolymer resin may have a weight average molecular weight of about 10,000 g/mol to about 300,000 g/mol, for example, about 50,000 g/mol to about 200,000 g/mol, as measured by GPC (gel permeation chromatography). Within this range, the thermoplastic resin composition can have good properties in terms of mechanical strength, formability, and the like.

In some embodiments, the aromatic vinyl copolymer resin may be present in an amount of about 40 wt % to about 95 wt %, for example, about 50 wt % to about 90 wt %, based on 100 wt % of the rubber-modified aromatic vinyl copolymer resin. Within this range, the thermoplastic resin composition can exhibit good properties in terms of transparency, impact resistance, heat resistance, fluidity, balance therebetween, and the like.

In some embodiments, the rubber-modified aromatic vinyl copolymer resin may be, for example, a methyl methacrylate-acrylonitrile-butadiene-styrene copolymer resin (MABS resin), which is a mixture of a methyl methacrylate-acrylonitrile-butadiene-styrene graft copolymer (g-MABS) and a styrene-acrylonitrile copolymer resin (SAN), without being limited thereto. Here, the MABS resin may have a structure in which g-MABS is dispersed in SAN.

(B) Poly(Alkyl (Meth)Acrylate) Resin

The poly(alkyl (meth)acrylate) resin according to the present invention serves to improve transparency, compatibility, impact resistance, and the like of the thermoplastic resin composition.

In some embodiments, the poly(alkyl (meth)acrylate) resin may be a polymer of a monomer including at least one $C_1$ to $C_{10}$ alkyl (meth)acrylate obtained by a polymerization method well-known in the art, for example, poly(methyl (meth)acrylate) (PMMA), poly(ethyl (meth)acrylate), poly(propyl (meth)acrylate), methyl (meth)acrylate, and a copolymer of a $C_2$ to $C_{10}$ alkyl (meth)acrylate, specifically poly(methyl methacrylate).

In some embodiments, the poly(alkyl (meth)acrylate) resin may be a transparent thermoplastic resin having a weight average molecular weight of about 50,000 g/mol to about 130,000 g/mol, for example, about 60,000 g/mol to about 120,000 g/mol, as measured by GPC. Within this range, the thermoplastic resin composition can have good transparency, impact resistance, and the like.

In some embodiments, the poly(alkyl (meth)acrylate) resin may have a glass transition temperature of about 90° C. to about 110° C., for example, about 95° C. to about 110° C. Within this range, the thermoplastic resin composition can have good heat resistance, compatibility, and the like.

In some embodiments, the poly(alkyl (meth)acrylate) resin may be present in an amount of about 50 parts by weight to about 150 parts by weight, for example, about 70 parts by weight to about 140 parts by weight, relative to about 100 parts by weight of the rubber-modified aromatic vinyl copolymer resin. If the content of the poly(alkyl (meth)acrylate) resin is less than about 50 parts by weight, the thermoplastic resin composition can suffer from deterioration in haze, transmittance, and the like, and if the content of the poly(alkyl (meth)acrylate) resin exceeds about 150 parts by weight, the thermoplastic resin composition can suffer from deterioration in impact resistance and the like.

(C) Silver (Ag) Compound

The silver compound according to the embodiment acts as an antibacterial agent and may be selected from among any silver-containing compounds without limitation. For example, the silver compound may include metallic silver, silver oxide, halogenated silver, a silver ion-containing support, and combinations thereof. In particular, a silver ion-containing support may be used as the silver compound. The support may include zeolite, silica gel, calcium phosphate, zirconium phosphate, phosphate-sodium-zirconium, phosphate-sodium-hydrogen-zirconium, and the like. The support preferably has a porous structure. Since the support having a porous structure can contain a silver component therein, the support can increase the content of the silver component while improving lasting performance (holding performance) of the silver component. Specifically, the silver compound may be silver sodium hydrogen zirconium phosphate.

In some embodiments, the silver compound may have an average particle diameter (D50) of about 1.5 μm or less, for example, about 0.1 μm to about 1 μm, as measured by a particle analyzer (Laser Diffraction Particle Size Analyzer LS I3 320, Beckman Coulter Co., Ltd.).

In some embodiments, the silver compound may be present in an amount of about 0.1 parts by weight to about 3 parts by weight, for example, about 0.5 parts by weight to about 2 parts by weight, relative to about 100 parts by weight of the rubber-modified aromatic vinyl copolymer resin. If the content of the silver compound is less than about 0.1 parts by weight relative to about 100 parts by weight of the rubber-modified aromatic vinyl copolymer resin, the thermoplastic resin composition can suffer from deterioration in antibacterial properties and the like, and if the content of the silver compound exceeds about 3 parts by weight, the thermoplastic resin composition can suffer from deterioration in haze and transmittance.

(D) Zinc Oxide

The zinc oxide according to the present invention serves to improve antibacterial properties, transparency, and metal texture of the thermoplastic resin composition together with the silver compound without deterioration in thermal stability, and consists of primary particles (single particles) and secondary particles formed through agglomeration of the primary particles, in which the primary particles may have an average particle diameter (D50) of about 1 nm to about 50 nm, for example, about 1 nm to about 30 nm and the secondary particles may have an average particle diameter (D50) of about 0.1 μm to about 10 μm, for example, about 0.5 μm to about 5 μm, as measured using a particle analyzer (Laser Diffraction Particle Size Analyzer LS I3 320, Beckman Coulter Co., Ltd.). If the average particle size of the primary zinc oxide particles is less than about 1 nm, the thermoplastic resin composition can suffer from deterioration in antibacterial properties and the like, and if the average particle size of the primary zinc oxide particles exceed about 50 nm, the thermoplastic resin composition can suffer from deterioration in metal texture and the like. In addition, if the average particle size of the secondary zinc oxide particles is less than about 0.1 μm, the thermoplastic resin composition can suffer from deterioration in antibacterial properties and the like, and if the average particle size of the secondary zinc oxide particles exceeds about 10 μm, the thermoplastic resin composition can suffer from deterioration in metal texture and the like.

In some embodiments, the zinc oxide may be present in an amount of about 0.5 parts by weight to about 10 parts by weight, for example, about 1 part by weight to about 7 parts by weight, relative to about 100 parts by weight of the rubber-modified aromatic vinyl copolymer resin. If the content of the zinc oxide is less than about 0.5 parts by weight relative to about 100 parts by weight of the rubber-modified aromatic vinyl copolymer resin, the thermoplastic resin composition can suffer from deterioration in antibacterial properties, and the like, and if the content of the zinc oxide exceeds about 10 parts by weight, the thermoplastic resin composition can suffer from deterioration in haze, transmittance, and the like.

In some embodiments, the silver compound and the zinc oxide may be present in a weight ratio (silver compound: zinc oxide) of about 1:3 to about 1:7. Within this range, the thermoplastic resin composition can exhibit better properties in terms of antibacterial properties, transparency, metal texture, and the like.

The thermoplastic resin composition according to one embodiment of the invention may further include additives used in typical thermoplastic resin compositions. Examples of the additives may include flame retardants, fillers, antioxidants, anti-dripping agents, lubricants, release agents, nucleating agents, antistatic agents, stabilizers, pigments, dyes, and mixtures thereof, without being limited thereto. The additives may be present in an amount of about 0.001 parts by weight to about 40 parts by weight, for example, about 0.1 parts by weight to about 10 parts by weight, relative to about 100 parts by weight of the rubber-modified aromatic vinyl copolymer resin.

The thermoplastic resin composition according to one embodiment of the invention may be prepared in pellet form by mixing the aforementioned components, followed by melt extrusion in a typical twin-screw extruder at about 200° C. to about 280° C., for example, about 220° C. to about 250° C.

In some embodiments, the thermoplastic resin composition has antibacterial effects against various bacteria, such as *Staphylococcus aureus, Escherichia coli, Bacillus subtilis, Pseudomonas aeruginosa, Salmonella*, Pneumonia, and MRSA (methicillin-resistant *Staphylococcus aureus*), and may have an antibacterial activity of about 2 to about 7, for example, about 2 to about 6, against each of *Staphylococcus aureus* and *Escherichia coli*, as calculated according to Equation 1 after inoculation of 5 cm×5 cm specimens with *Staphylococcus aureus* and *Escherichia coli*, respectively, and culturing under conditions of 35° C. and 90% RH for 24 hours in accordance with JIS Z 2801.

$$\text{Antibacterial activity} = \log(M1/M2) \quad \text{[Equation 1]}$$

where M1 denotes the number of bacteria as measured on a blank specimen after culturing for 24 hours and M2 denotes the number of bacteria as measured on each of the specimens of the thermoplastic resin composition after culturing for 24 hours.

Here, the "blank specimen" refers to a control specimen for comparison with a test specimen (specimen of the thermoplastic resin composition). Specifically, the blank specimen is prepared by inoculating an empty petri dish with bacteria, which is suitable for checking whether the bacteria grow normally, followed by culturing for 24 hours under the same conditions as the test specimen. Antibacterial performance of the test specimen is evaluated based on comparison of the number of cultured bacteria between the blank specimen and the test specimen. Here, the "number of cultured bacteria" may be determined through a process in which each specimen is inoculated with the bacteria, followed by culturing for 24 hours, and then an inoculation solution of the bacteria is recovered and diluted, followed by growth of the bacteria into a colony on a culture dish. When population of the colony is too large to count, the number of cultured bacteria may be determined by dividing the colony into multiple sectors, measuring the population size of one sector, and converting the measured value into total population.

In some embodiments, the thermoplastic resin composition may have a haze of about 1% to about 5%, for example, about 2% to 4.1%, and a light transmittance of about 88% to about 93%, for example, about 89% to 92%, as measured on a 2.5 mm thick specimen in accordance with ASTM D1003.

In some embodiments, the thermoplastic resin composition may have a flop index of about 8 to about 11, for example, about 8 to about 10, as calculated by Equation 2. Within this range, the thermoplastic resin composition (molded product) can exhibit good metal texture.

$$\text{Flop Index} = \frac{2.69(L^*_{15°} \cdot L^*_{110°})^{1.11}}{(L^*_{45°})^{0.86}} \quad \text{[Equation 2]}$$

where $L^*_{15°}$, $L^*_{45°}$ and $L^*_{110°}$ mean luminance L* of reflected light, as measured at angles of 15°, 45° and 110° using a spectrophotometer, respectively.

A molded product according to the present invention is formed of the thermoplastic resin composition set forth above. The antibacterial thermoplastic resin composition may be prepared in pellet form. The prepared pellets may be produced into various molded articles (products) by various molding methods such as injection molding, extrusion, vacuum molding, and casting. These molding methods are well known to those skilled in the art. The molded product according to the present invention has good antibacterial properties, impact resistance, chemical resistance, weather resistance, fluidity (molding processability), and balance therebetween and thus is useful as materials for antibacterial products, external components, and the like, which are frequently exposed to body contact.

MODE FOR INVENTION

Next, the present invention will be described in more detail with reference to some examples. It should be understood that these examples are provided for illustration only and are not to be in any way construed as limiting the present invention.

EXAMPLE

Details of components used in Examples and Comparative Examples are as follows:
(A) Rubber-Modified Aromatic Vinyl Copolymer Resin
A rubber-modified aromatic vinyl copolymer resin including 28 wt % of (A1) a rubber-modified vinyl graft copolymer and 72 wt % of (A2) an aromatic vinyl copolymer resin was used.
(A1) Rubber-Modified Vinyl Graft Copolymer
A core-shell type graft copolymer (g-MABS) obtained through graft copolymerization of 45 wt % of styrene, acrylonitrile and methyl methacrylate (styrene/acrylonitrile/methyl methacrylate: 20 wt %/10 wt %/70 wt %) to 55 wt % of butadiene rubber particles having an average (Z-average) particle diameter of 0.28 μm was used.
(A2) Aromatic Vinyl Copolymer Resin
A SAN resin (weight average molecular weight: 130,000 g/mol) obtained through polymerization of 80 wt % of styrene and 20 wt % of acrylonitrile was used.
(B) Poly(Alkyl (Meth)Acrylate) Resin
A poly(methyl methacrylate) resin (PMMA, weight average molecular weight: 100,000 g/mol) was used.
(C) Silver (Ag) Compound
Silver sodium hydrogen zirconium phosphate (Manufacturer: Toa Gosei Co., Ltd, Product Name: Novaron AGZ030) was used.
(D) Zinc Oxide
(D1) Zinc oxide (Manufacturer: SH Energy & Chemical, Product Name: ANYZON) comprising primary particles having an average particle diameter (D50) of 10 nm and secondary particles having an average particle diameter (D50) of 1.7 μm was used.
(D2) Zinc oxide (Manufacturer: PJ ChemTech, Product Name: KS-1) comprising simple particles and having an average particle diameter (D50) of 1.0 μm was used.

Examples 1 to 5 and Comparative Examples 1 to 5

The aforementioned components were mixed in amounts as listed in Table 1, followed by extrusion at 230° C., thereby preparing a thermoplastic resin composition in pellet form. Here, extrusion was performed using a twin-screw extruder (L/D: 36, Φ: 45 mm). The prepared pellets were dried at 80° C. for 4 hours or more and then subjected to injection molding using a 6 oz. injection machine (molding temperature: 230° C., mold temperature: 60° C.), thereby preparing a specimen. The prepared specimen was evaluated as to the following properties. Results are shown in Table 2.
Property Evaluation
(1) Antibacterial activity: In accordance with JIS Z 2801, 5 cm×5 cm specimens were inoculated with *Staphylococcus aureus* and *Escherichia coli*, respectively, and subjected to culturing under conditions of 35° C. and 90% RH for 24 hours, followed by calculation of antibacterial activity according to Equation 1.

$$\text{Antibacterial activity} = \log(M1/M2), \quad \text{[Equation 1]}$$

where M1 denotes the number of bacteria as measured on a blank specimen after culturing for 24 hours and M2 denotes the number of bacteria as measured on each of the specimens after culturing for 24 hours.
(2) Haze and transmittance (unit: %): Haze and transmittance were measured on a 2.5 mm thick specimen using a haze meter NDH 2000 (Nippon Denshoku Co., Ltd.) in accordance with ASTM D1003.

(3) Flop index: Flop index of the thermoplastic resin composition prepared in pellet form in each of Examples and Comparative Examples was calculated according to Equation 2.

$$\text{Flop Index} = \frac{2.69(L^*_{15°} \cdot L^*_{110°})^{1.11}}{(L^*_{45°})^{0.86}} \quad \text{[Equation 2]}$$

where $L^*_{15°}$, $L^*_{45°}$ and $L^*_{110°}$ mean luminance $L^*$ of reflected light, as measured at angles of 15°, 45° and 110° using a spectrophotometer (Manufacturer: BYK, Model: BYK Mac), respectively.

TABLE 1

| | Example | | | | |
|---|---|---|---|---|---|
| | 1 | 2 | 3 | 4 | 5 |
| (A) (parts by weight) | 100 | 100 | 100 | 100 | 100 |
| (B) (parts by weight) | 104 | 104 | 104 | 104 | 104 |
| (C) (parts by weight) | 0.3 | 0.6 | 0.9 | 0.6 | 0.6 |
| (D1) (parts by weight) | 3 | 3 | 3 | 1 | 5 |
| (D2) (parts by weight) | — | — | — | — | — |
| Antibacterial activity (E. coli) | 2.8 | 3.1 | 3.5 | 2.4 | 3.7 |
| Antibacterial activity (S. aureus) | 2.2 | 2.7 | 3.1 | 2.1 | 3.1 |
| Haze (%) | 2.5 | 2.8 | 3.5 | 2.1 | 4.1 |
| Light transmittance (%) | 91 | 90 | 90 | 91 | 89 |
| Flop Index | 10 | 10 | 9 | 10 | 8 |

TABLE 2

| | Comparative Example | | | | |
|---|---|---|---|---|---|
| | 1 | 2 | 3 | 4 | 5 |
| (A) (parts by weight) | 100 | 100 | 100 | 100 | 100 |
| (B) (parts by weight) | 104 | 104 | 104 | 104 | 104 |
| (C) (parts by weight) | 0.05 | 4 | 0.6 | 0.6 | 0.6 |
| (D1) (parts by weight) | 3 | 3 | 0.1 | 11 | — |
| (D2) (parts by weight) | — | — | — | — | 3 |
| Antibacterial activity (E. coli) | 1.7 | 3.6 | 0.8 | 4.2 | 2.6 |
| Antibacterial activity (S. aureus) | 1.5 | 3.3 | 0.5 | 3.8 | 2.4 |
| Haze (%) | 2.6 | 8.2 | 1.7 | 9.2 | 2.3 |
| Light transmittance (%) | 91 | 85 | 92 | 83 | 90 |
| Flop Index | 9 | 6 | 10 | 1 | 1 |

From the results, it can be seen that the thermoplastic resin composition according to the present invention has good properties in terms of antibacterial properties, thermal stability, transparency, metal texture (Flop index), and the like.

Conversely, it could be seen that the thermoplastic resin composition of Comparative Example 1 prepared using an insufficient amount of the silver compound suffered from deterioration in antibacterial properties and the like; the thermoplastic resin composition of Comparative Example 2 prepared using an excess of the silver compound suffered from deterioration in haze, transmittance, and the like; the thermoplastic resin composition of Comparative Example 3 prepared using an insufficient amount of zinc oxide suffered from deterioration in antibacterial properties and the like; and the thermoplastic resin composition of Comparative Example 4 prepared using an excess of zinc oxide suffered from deterioration in haze, transmittance, metal texture, and the like. Further, it could be seen that the thermoplastic resin composition of Comparative Example 5 prepared using zinc oxide (D2) instead of the zinc oxide according to the present invention suffered from deterioration in metal texture, and the like.

It should be understood that various modifications, changes, alterations, and equivalent embodiments can be made by those skilled in the art without departing from the spirit and scope of the invention.

The invention claimed is:

1. A thermoplastic resin composition comprising:
    about 100 parts by weight of a rubber-modified aromatic vinyl copolymer resin;
    about 50 to about 150 parts by weight of a poly (alkyl (meth)acrylate) resin;
    about 0.1 to about 3 parts by weight of a silver (Ag) compound; and
    about 0.5 to about 10 parts by weight of zinc oxide,
    wherein the zinc oxide comprises primary particles and secondary particles, the primary particles having an average particle diameter (D50) of about 1 nm to about 50 nm, the secondary particles having an average particle diameter (D50) of about 0.1 μm to about 10 μm, and
    wherein the thermoplastic resin composition has a flop index of about 8 to about 11, as calculated by Equation 2:

$$\text{Flop Index} = \frac{2.69(L''_{15°} \cdot L''_{110°})^{1.11}}{(L''_{45°})^{0.86}} \quad \text{[Equation 2]}$$

where $L''_{15°}$, $L''_{45°}$ and $L''_{110°}$ mean luminance $L''$ of reflected light, as measured at angles of 15°, 45° and 110° using a spectrophotometer, respectively.

2. The thermoplastic resin composition according to claim 1, wherein the silver compound and the zinc oxide are present in a weight ratio (silver compound:zinc oxide) of about 1:3 to about 1:7.

3. The thermoplastic resin composition according to claim 1, wherein the rubber-modified aromatic vinyl copolymer resin comprises a rubber-modified vinyl graft copolymer and an aromatic vinyl copolymer resin.

4. The thermoplastic resin composition according to claim 3, wherein the rubber-modified vinyl graft copolymer is obtained through graft polymerization of an alkyl (meth) acrylate, an aromatic vinyl monomer, and a vinyl cyanide monomer to a rubber polymer.

5. The thermoplastic resin composition according to claim 3, wherein the aromatic vinyl copolymer resin is obtained through polymerization of an aromatic vinyl monomer and a monomer copolymerizable with the aromatic vinyl monomer.

6. The thermoplastic resin composition according to claim 1, wherein the poly (alkyl (meth)acrylate) resin has a weight average molecular weight of about 50,000 g/mol to about 150,000 g/mol.

7. The thermoplastic resin composition according to claim 1, wherein the silver compound is selected from the group consisting of metallic silver, silver oxide, halogenated silver, silver ion-containing support, and combinations thereof.

8. The thermoplastic resin composition according to claim 1, wherein the thermoplastic resin composition has an antibacterial activity of about 2 to about 7 against each of Staphylococcus aureus and Escherichia coli, as calculated according to Equation 1 after inoculation of 5 cm×5 cm specimens with Staphylococcus aureus and Escherichia

*coli*, respectively, and culturing under conditions of 35° C. and 90% RH (relative humidity) for 24 hours in accordance with JIS Z 2801:

[Equation 1]

$$\text{Antibacterial activity} = \log(M1/M2) \quad \text{[Equation 1]}$$

where M1 denotes the number of bacteria as measured on a blank specimen after culturing for 24 hours and M2 denotes the number of bacteria as measured on each of the specimens of the thermoplastic resin composition after culturing for 24 hours.

9. The thermoplastic resin composition according to claim 1, wherein the thermoplastic resin composition has a haze of about 1% to about 5% and a light transmittance of about 88% to about 93%, as measured on a 2.5 mm thick specimen in accordance with ASTM D1003.

10. A molded product formed of the thermoplastic resin composition according to claim 1.

11. The thermoplastic resin composition according to claim 1, comprising about 3 to about 10 parts by weight of the zinc oxide.

* * * * *